United States Patent [19]

Renz

[11] 4,027,223
[45] May 31, 1977

[54] TRANSCEIVER POLARITY PROTECTOR

[76] Inventor: Frank G. Renz, 29 Duo Drive, Lancaster, Pa. 17603

[22] Filed: July 6, 1976

[21] Appl. No.: 702,433

[52] U.S. Cl. .................................. 320/26; 307/127; 325/312; 361/246
[51] Int. Cl.² ..................... H01H 83/08; H02J 7/00
[58] Field of Search .......... 320/2, 25, 26; 325/312, 325/313; 317/7, 8; 307/127

[56] References Cited
UNITED STATES PATENTS

| 3,413,487 | 11/1968 | Gershen | 320/26 X |
| 3,627,301 | 8/1966 | Gignac | 320/25 X |
| 3,700,999 | 10/1972 | Gourse | 320/26 |

FOREIGN PATENTS OR APPLICATIONS 1,388,655  3/1975  United Kingdom ............... 325/312

Primary Examiner—Robert J. Hickey
Attorney, Agent, or Firm—Martin Fruitman

[57] ABSTRACT

A protective device for portable transceivers to assure that improper polarity is not applied to the power input. Two relays, oppositely polarized from each other by use of diodes, sense the applied power polarity and connect that power so that the power applied to the transceivers is always correct.

2 Claims, 1 Drawing Figure

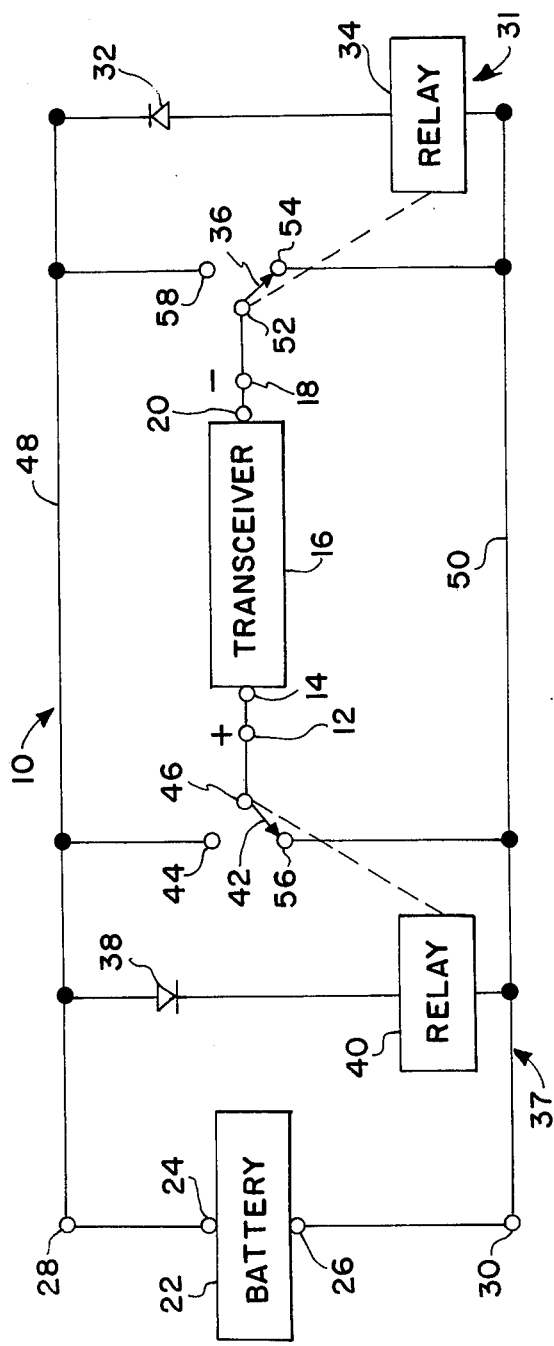

TRANSCEIVER POLARITY PROTECTOR

BACKGROUND OF THE INVENTION

This invention relates generally to interconnection systems and more specifically to an apparatus for protecting mobile transceivers from the application of improper polarity on the power terminals.

The literal explosion in the use of mobile transceivers such as citizens band radios has brought into the field many people who have no previous experience with electronics. These newcomers, accustomed as they are to the use of household alternating current power, have little or no appreciation of the significance of polarity in electronic devices which are operted from batteries. Their entire experience to "plugging-in" appliances completely negates any instructions accompanying the mobile transceiver. In the house, it never matters which way one plugs in a power cord, so it is likely that the instructions on connecting a mobile radio will not be read until after the unit is installed and is found not to operate. By that time, given the odds of one out of two choices being wrong, the transceiver is likely to be severely damaged.

This problem is aggravated by the tendency of many mobile operators to move their units from one vehicle to another, again with no appreciation of the fact that vehicles are manufactured with both positive grounds and negative grounds. The result is that a trucker, who has had the use of his citizens band radio is his truck and had decided to arrange it detachably so that it can also be used in his automobile or another truck, is likely to damage the radio in attempting to use it in another vehicle because of a change in vehicle polarity relative to the mounting brackets.

This substantial likelihood of damage to expensive equipment points out the requirement for an inexpensive protective system which operates automatically to both protect the transceiver from incorrect polarity and also to place properly polarized power on the transceiver so that it will operate without further reconnection, regardless of the polarity of the original connection.

SUMMARY OF THE INVENTION

The invention is an apparatus for protecting a mobile transceiver from damage due to the application of reverse polarized power. Regardless of the polarity applied to the two input terminals the polarity of the two output terminals is always the same. Therefore, a transceiver permanently connected to the output terminals of the invention is supplied with the proper polarity, and, as long as the polarity protector is left connected to the transceiver, the combination may be moved and connected to any battery or automobile without concern for polarity. The present invention, in effect, makes the transceiver power hookup "foolproof".

This is accomplished by the presence of two polarity sensing control devices, such as two polarized relays, within the polarity protector. Each relay is connected in series with a diode, the two diodes being reversed relative to each other, and the combination of relay and diode is connected across the input terminals of unknown polarity. Whichever polarity is applied to the input terminals, only one relay is actuated because the other relay is prevented from being powered by the voltage blocking characteristic of the diode in series with it.

The contacts of the relays are arranged to switch the polarized output terminals onto a power buss within the polarity protector based upon which relay is operated. The relays, therefore, act as a logic circuit which senses polarity and then attaches the output terminals to the proper power busses to achieve the correct polarity on the output.

BRIEF DESCRIPTION OF THE DRAWING

The FIG. is a schematic diagram of the electrical circuit of the invention.

DETAILED DESCRIPTION OF THE INVENTION

One preferred embodiment of the basic circuit of the invention is illustrated in the figure where positive output terminal 12 of polarity protector 10 is connected to the positive power terminal 14 of mobile transceiver 16 and negative output terminal 18 is connected to negative power terminal 20 of transceiver 16. These connections are made only once during the useful life of transceiver 16 and may be made at the factory, permanently wired by the user or at the point of sale, or independently installed in conjunction with an existing installation by the use of conventional detachable connectors. In any case, the connection between transceiver 16 and polarity protector 10 is considered permanent and all subsequent disconnection of the transceiver 16 from battery 22 should take place at battery terminals 24 and 26.

To put transceiver 16 into operation in a new location, input terminal 28 of polarity protector 10 is connected to battery terminal 24 and input terminal 30 is connected to battery terminal 26. No polarity need be observed during this operation.

If terminal 28 is there by connected to the positive terminal of battery 22, polarity sensing control circuit 31, consisting of semiconductor diode 32 and relay coil 34, is not activated because diode 32 blocks the current flow through relay coil 34 and relay arm 36 remains in the normally closed position shown. In such a case, however, polarity sensing control circuit 37 is properly connected to allow activation of relay coil 40 through semiconductor diode 38, thus switching relay arm 42 from the normally closed position shown so that contact 44 is connected to contact 46. This action applies the voltage on power buss 48, which is of positive polarity, to positive output terminal 12. Negative output terminal 18 remains connected to power buss 50 because relay contacts 52 and 54 remain connected through relay arm 36.

If terminal 28 is connected to the negative terminal of battery 22, diode 38 blocks the current flow through relay coil 40 and relay arm 42 remains in the normally closed position shown. This leaves positive output terminal 12 connected to power buss 50 through relay contacts 46 and 56. In such a case, however, diode 32 is properly connected to allow activation of relay coil 34, thus switching relay arm 36 from the normally closed position at contact 54 to contact 58. Negative output terminal 18 is thereby connected to power buss 48 through relay contacts 52 and 58 and the proper polarity is again established on the output terminals.

It should be noted that the switching action of the polarity protector is not a conventional reversing action. The inactivated condition of the polarity protector is such that output terminals 12 and 18 are shorted together through relay contacts 46 and 56, power buss 50 and relay contacts 54 and 52. This connection makes it impossible to apply the improper polarity to output terminals 12 and 18 even momentarily while the circuit is "deciding" which polarity is proper. The inactivated condition is such that no power whatsoever is applied to transceiver 16 until the circuit senses which polarity is being applied on the input. Then, and only then, is the correct polarity applied to the transceiver.

Furthermore, the circuit of FIG. 1 is virtually fail-safe in that the typical failures anticipated for the included components will not cause improper polarity to be applied to transceiver 16. For instance, if relay coil 40 should fail, or diode 38 should open, polarity protector 10 will continue to operate properly for battery terminal 24 being negative, and will simply not have power applied if battery terminal 24 is positive. No improper polarity will be applied, however. Failure of relay coil 34 or opening of diode 32 is likewise fail-safe.

Similarly, if diode 38 should short out, the most likely mode of failure, polarity protector 10 will operate properly with terminal 24 positive and if terminal 24 is negative both relay coil 40 and relay coil 34 will activate and no power will be applied. Again, no improper polarity is applied.

It is to be understood that the form of the invention herein shown is merely a preferred embodiment. Various changes may be made in the operation and arrangement of individual components; equivalent means may be substituted for those illustrated and described and certain features may be used independently from others without departing from the spirit and scope of the invention as defined in the following claims.

What is claimed as new and desired to be secured by Letters Patent of the United States is:

1. An apparatus for protecting a mobile transceiver from the application of reversed polarity battery power comprising:
   a first input terminal means;
   a first power buss means electrically connected to the first input terminal means;
   a second input terminal means;
   a second power buss means electrically connected to the second input terminal means;
   a first polarity sensing control means electrically connected to both the first power buss means and the second power buss means whereby said first polarity sensing control means is subjected to the voltage between the first power buss means and the second power buss means;
   a second polarity sensing control means electrically connected to both the first power buss means and the second power buss means, with its polarity of activation reversed from the polarity of activation of the first polarity sensing control means, whereby said second polarity sensing control means is also subjected to the voltage between the first power buss means and the second power buss means;
   a positive output terminal means;
   a negative output terminal means;
   a first contact means, connected to and activated by the first polarity sensing control means, when not activated connecting the positive output terminal means to the second power buss means, and, when activated, connecting the positive output terminal means to the first power buss means; and
   a second contact means, connected to and activated by the second polarity sensing control means, when not activated connecting the negative output terminal means to the second power buss means, and, when activated, connecting the negative output terminal to the first power buss means.

2. An apparatus for protecting a mobile transceiver from the application of reversed polarity battery power as in claim 1 wherein:
   the first polarity sensing control means is a first relay coil in series with a first semiconductor diode;
   the first contact means is a set of contacts activated by the first relay coil;
   the second polarity sensing control means is a second relay coil in series with a second semiconductor diode, the polarity of said second semiconductor being reversed from that of the first semiconductor diode; and
   the second contact means is a set of contacts activated by the second relay coil.

* * * * *